United States Patent
Dellock et al.

(10) Patent No.: US 10,343,622 B2
(45) Date of Patent: Jul. 9, 2019

(54) INTERIOR AND EXTERIOR IRIDESCENT VEHICLE APPLIQUES

(71) Applicant: Ford Global Technologies, LLC, Dearborn, MI (US)

(72) Inventors: Paul Kenneth Dellock, Northville, MI (US); Stuart C. Salter, White Lake, MI (US); Talat Karmo, Waterford, MI (US); Michael Musleh, Canton, MI (US); Joseph Myszka, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 197 days.

(21) Appl. No.: 15/177,588

(22) Filed: Jun. 9, 2016

(65) Prior Publication Data

US 2017/0355321 A1    Dec. 14, 2017

(51) Int. Cl.
| | |
|---|---|
| *B60Q 1/50* | (2006.01) |
| *B60Q 3/74* | (2017.01) |
| *B60R 13/00* | (2006.01) |
| *B60R 13/02* | (2006.01) |
| *B60R 13/04* | (2006.01) |
| *C09K 11/66* | (2006.01) |
| *F21S 43/13* | (2018.01) |
| *F21S 43/14* | (2018.01) |
| *F21S 43/15* | (2018.01) |
| *F21S 43/20* | (2018.01) |

(52) U.S. Cl.
CPC .............. *B60R 13/00* (2013.01); *B60R 13/02* (2013.01); *B60R 13/04* (2013.01); *C09K 11/663* (2013.01); *F21S 43/13* (2018.01); *F21S 43/14* (2018.01); *F21S 43/15* (2018.01); *F21S 43/26* (2018.01); *B60Q 1/50* (2013.01); *B60Q 3/745* (2017.02); *B60R 2013/0287* (2013.01)

(58) Field of Classification Search
CPC ...... B60Q 2500/10; B60Q 3/54; B60Q 1/323; B60Q 3/745; B60Q 3/217; B60Q 3/233
USPC ................................................. 362/459–549
See application file for complete search history.

(56) References Cited

U.S. PATENT DOCUMENTS

| | | | |
|---|---|---|---|
| 2,486,859 A | 11/1949 | Meijer et al. |
| 5,053,930 A | 10/1991 | Benavides |
| 5,434,013 A | 7/1995 | Fernandez |
| 5,709,453 A | 1/1998 | Krent et al. |
| 5,839,718 A | 11/1998 | Hase et al. |
| 6,031,511 A | 2/2000 | DeLuca et al. |
| 6,117,362 A | 9/2000 | Yen et al. |

(Continued)

FOREIGN PATENT DOCUMENTS

| | | |
|---|---|---|
| CN | 101337492 A | 1/2009 |
| CN | 201169230 Y | 2/2009 |

(Continued)

*Primary Examiner* — William J Carter
(74) *Attorney, Agent, or Firm* — Vichit Chea; Price Heneveld LLP

(57) ABSTRACT

A vehicle applique is provided that includes a substantially transparent substrate defining first and second surfaces, a decorative film positioned on the first surface of the substrate, and an over-mold positioned over the film. The over-mold defines at least one diffraction grating and a light source is positioned proximate the second surface of the substrate. The light source is configured to emit light through the substrate and the over-mold.

18 Claims, 10 Drawing Sheets

(56) References Cited

U.S. PATENT DOCUMENTS

| | | | |
|---|---|---|---|
| 6,160,475 A * | 12/2000 | Hornung | B60Q 3/217 |
| | | | 362/501 |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | Ia Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,324,835 B2 | 12/2012 | Shum et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,449,161 B2 * | 5/2013 | Igoe | B60R 13/0243 |
| | | | 362/487 |
| 8,459,832 B2 | 6/2013 | Kim | |
| 8,466,438 B2 | 6/2013 | Lambert et al. | |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 * | 6/2014 | Marx | F21K 9/00 |
| | | | 257/88 |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthal et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 2002/0159741 A1 | 10/2002 | Graves et al. | |
| 2002/0163792 A1 | 11/2002 | Formoso | |
| 2003/0167668 A1 | 9/2003 | Fuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0189795 A1 | 9/2005 | Roessler | |
| 2006/0087826 A1 | 4/2006 | Anderson, Jr. | |
| 2006/0097121 A1 | 5/2006 | Fugate | |
| 2006/0226758 A1 | 10/2006 | Sofue et al. | |
| 2007/0032319 A1 | 2/2007 | Tufte | |
| 2007/0285938 A1 | 12/2007 | Palmer et al. | |
| 2007/0297045 A1 | 12/2007 | Sakai et al. | |
| 2008/0205075 A1 | 8/2008 | Hikmet et al. | |
| 2008/0274321 A1 | 11/2008 | Lefaux et al. | |
| 2009/0080208 A1 * | 3/2009 | Droste | B60Q 1/323 |
| | | | 362/509 |
| 2009/0217970 A1 | 9/2009 | Zimmerman et al. | |
| 2009/0219730 A1 | 9/2009 | Syfert et al. | |
| 2009/0251920 A1 * | 10/2009 | Kino | B60Q 1/323 |
| | | | 362/602 |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0265360 A1 | 11/2011 | Podd et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 * | 2/2013 | Van De Ven | F21V 3/04 |
| | | | 362/84 |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 * | 7/2014 | Cannon | B60Q 3/54 |
| | | | 362/555 |
| 2014/0264396 A1 | 9/2014 | Lowenthal et al. | |
| 2014/0266666 A1 | 9/2014 | Habibi | |
| 2014/0373898 A1 | 12/2014 | Rogers et al. | |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |
| 2015/0267881 A1 | 9/2015 | Salter et al. | |
| 2015/0283940 A1 | 10/2015 | Salter et al. | |
| 2015/0307033 A1 * | 10/2015 | Preisler | B60R 13/02 |
| | | | 362/488 |
| 2016/0016506 A1 | 1/2016 | Collins et al. | |
| 2016/0102819 A1 | 4/2016 | Misawa et al. | |
| 2016/0131327 A1 | 5/2016 | Moon et al. | |
| 2016/0236613 A1 | 8/2016 | Trier | |
| 2016/0240794 A1 | 8/2016 | Yamada et al. | |

(56) References Cited

U.S. PATENT DOCUMENTS

2017/0158125 A1   6/2017   Schuett et al.
2017/0253179 A1   9/2017   Kumada

FOREIGN PATENT DOCUMENTS

| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2027986 A1 | 2/2009 |
| EP | 2778209 A1 | 9/2014 |
| JP | 2000159011 A | 6/2000 |
| JP | 2007238063 A | 9/2007 |
| KR | 20060026531 A | 3/2006 |
| WO | 2006047306 A1 | 5/2006 |
| WO | 2014068440 A1 | 5/2014 |
| WO | 2014161927 A1 | 10/2014 |

\* cited by examiner

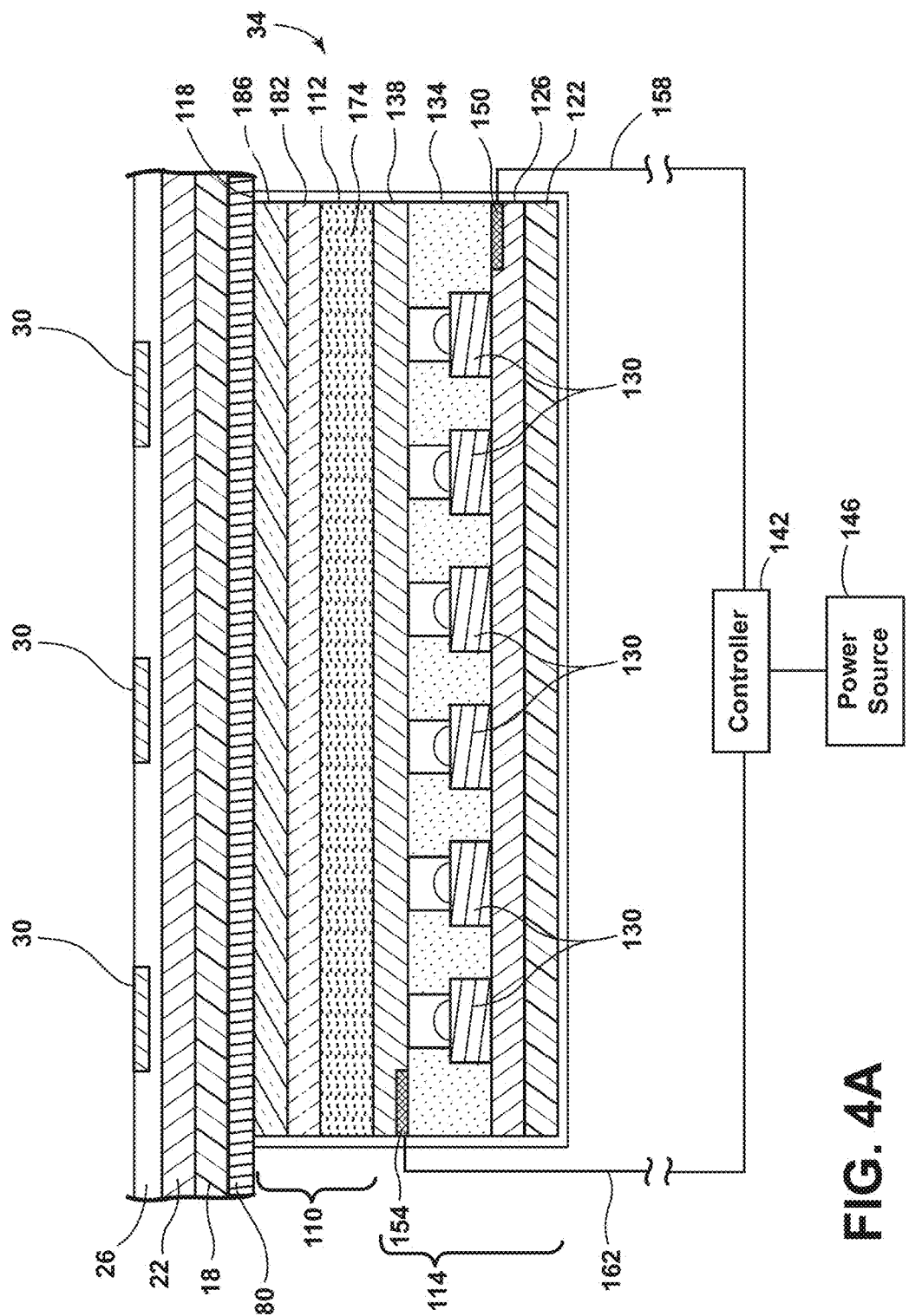

though not limited to, positions that are considered interior and exterior to the vehicle 10. For example, the applique 14 may additionally or alternatively be positioned on an interior panel 42 of the vehicle 10 (FIG. 1B). The interior panel 42 may be a door panel, a dashboard, an instrument cluster, a center console and/or other such interior components of the vehicle 10.

INTERIOR AND EXTERIOR IRIDESCENT VEHICLE APPLIQUES

FIELD OF THE INVENTION

The present disclosure generally relates to vehicle appliques, and more particularly, to lighting systems and appliques for automotive vehicles having iridescent features.

BACKGROUND OF THE INVENTION

Illumination systems used in vehicles may offer a unique and attractive viewing experience. It is therefore desired to incorporate such illumination systems in portions of vehicles to provide accent and functional lighting. Additionally, iridescent features may provide aesthetically pleasing appearances.

SUMMARY OF THE INVENTION

According to one aspect of the present invention, a vehicle applique is provided that includes a substantially transparent substrate defining first and second surfaces, a decorative film positioned on the first surface of the substrate, and an over-mold positioned over the film. The over-mold defines at least one diffraction grating and a light source is positioned proximate the second surface of the substrate. The light source is configured to emit light through the substrate and the over-mold.

According to another aspect of the present invention, a vehicle is provided that includes an exterior body panel and an applique positioned on the exterior body panel that includes a substrate defining a surface. A decorative film is positioned on the surface of the substrate and an over-mold defines a first surface and a second surface with the film positioned on the decorative film. The over-mold defines a plurality of diffraction gratings.

According to yet another aspect of the present invention, a vehicle is provided that includes an interior panel and an applique positioned on the interior panel with a substantially transparent substrate and an over-mold positioned on the substrate. The over-mold defines at least one diffraction grating and a light source is positioned on the substrate and configured to emit light through the substrate.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 4A is an enhanced view taken at section IV of FIG. 2, illustrating a light assembly according to one embodiment;

DETAILED DESCRIPTION OF THE PREFERRED EMBODIMENTS

Figure 1A:
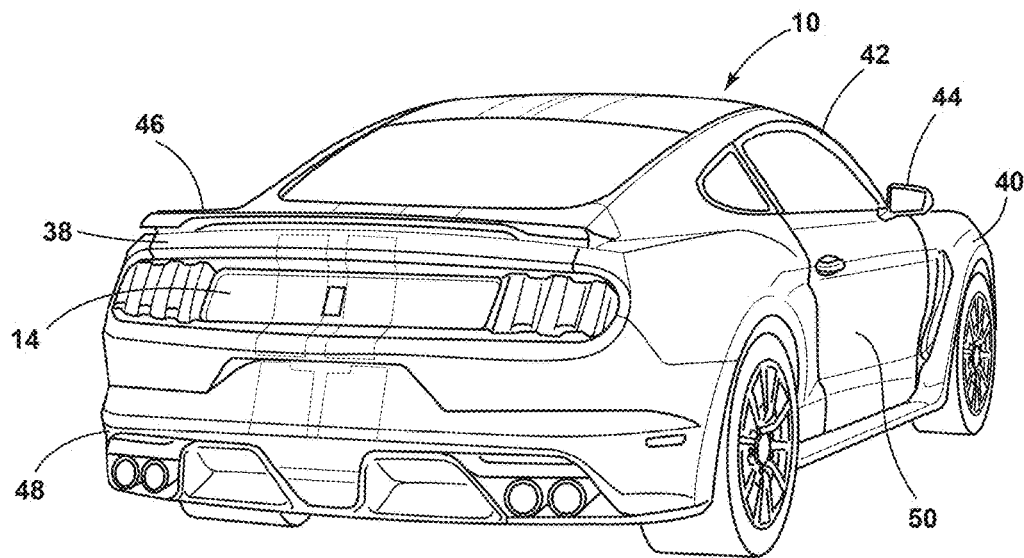
FIG. 1A is rear perspective view of a vehicle, according to one embodiment.

Additional features and advantages of the invention will be set forth in the detailed description which follows and will be apparent to those skilled in the art from the description or recognized by practicing the invention as described in the following description together with the claims and appended drawings.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

Referring now to FIGS. 1A-5, reference numeral 10 generally designates a vehicle having an applique 14. The applique 14 may include a substrate 18 defining a first surface 18A and a second surface 18B. A decorative layer 22 is positioned on the first surface 18A of the substrate 18. An over-mold 26 is positioned over the decorative layer 22. The over-mold 26 defines at least one diffraction grating 30. A light source 34 is positioned proximate the second surface 18B of the substrate 18. The light source 34 is configured to emit light through the substrate 18 and the over-mold 26.

Figure 1B:
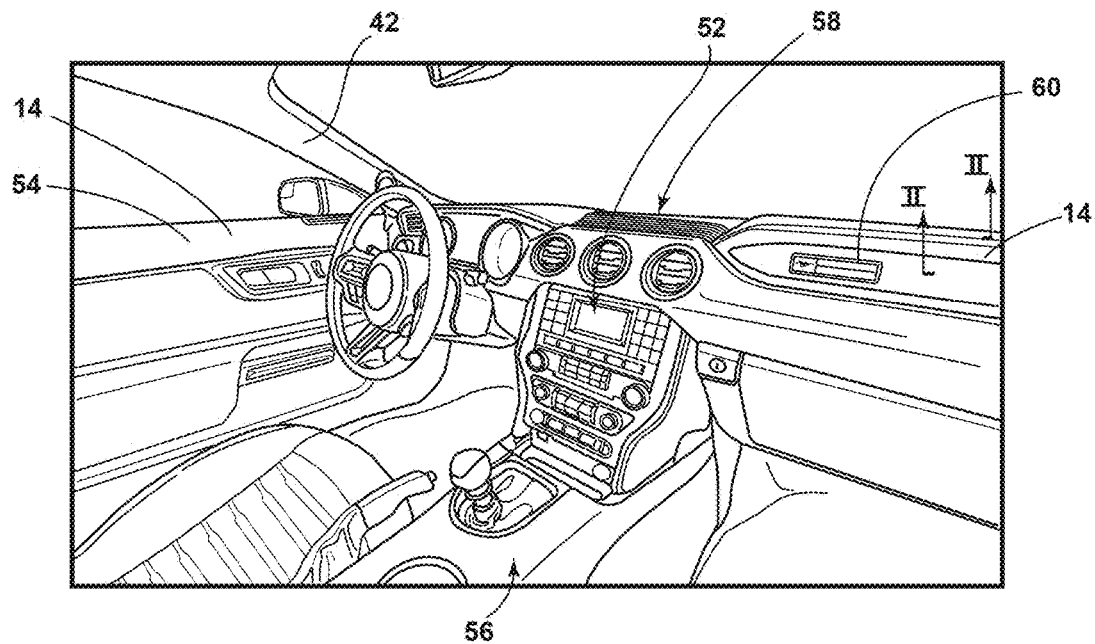
FIG. 1B is perspective view of the front interior of the vehicle of FIG. 1A, according to one embodiment.

Referring now to FIGS. 1A and 1B, the applique 14 may be positioned in a variety of locations on the vehicle 10. For example, the applique 14 may be positioned on an exterior body panel of the vehicle 10 (FIG. 1A). In the depicted embodiment, the exterior body panel is a trunk lid 38. It will be understood that the applique 14 may be positioned in one, or a plurality, of locations along one or more exterior body panels of the vehicle 10. For example, the applique 14 may be positioned on fenders 40, roof pillars 42, exterior mirrors 44, spoilers 46, bumpers 48, exterior surfaces of a door 50 or other locations around the exterior of the vehicle 10. In other examples, the applique 14 may be positioned in one, or a plurality, of locations on interior surfaces (e.g., A-surfaces) of the vehicle 10 (FIG. 1B). For example, the applique 14 may be positioned proximate or on an infotainment system 52, on door trim 54, A-surfaces of the roof pillars 42, a center console 56 and an instrument panel 58. According to various embodiments, the decorative layer 22 may define one or more indicium 60 which may be visible through the over-mold 26 (FIG. 2).

Figure 2:
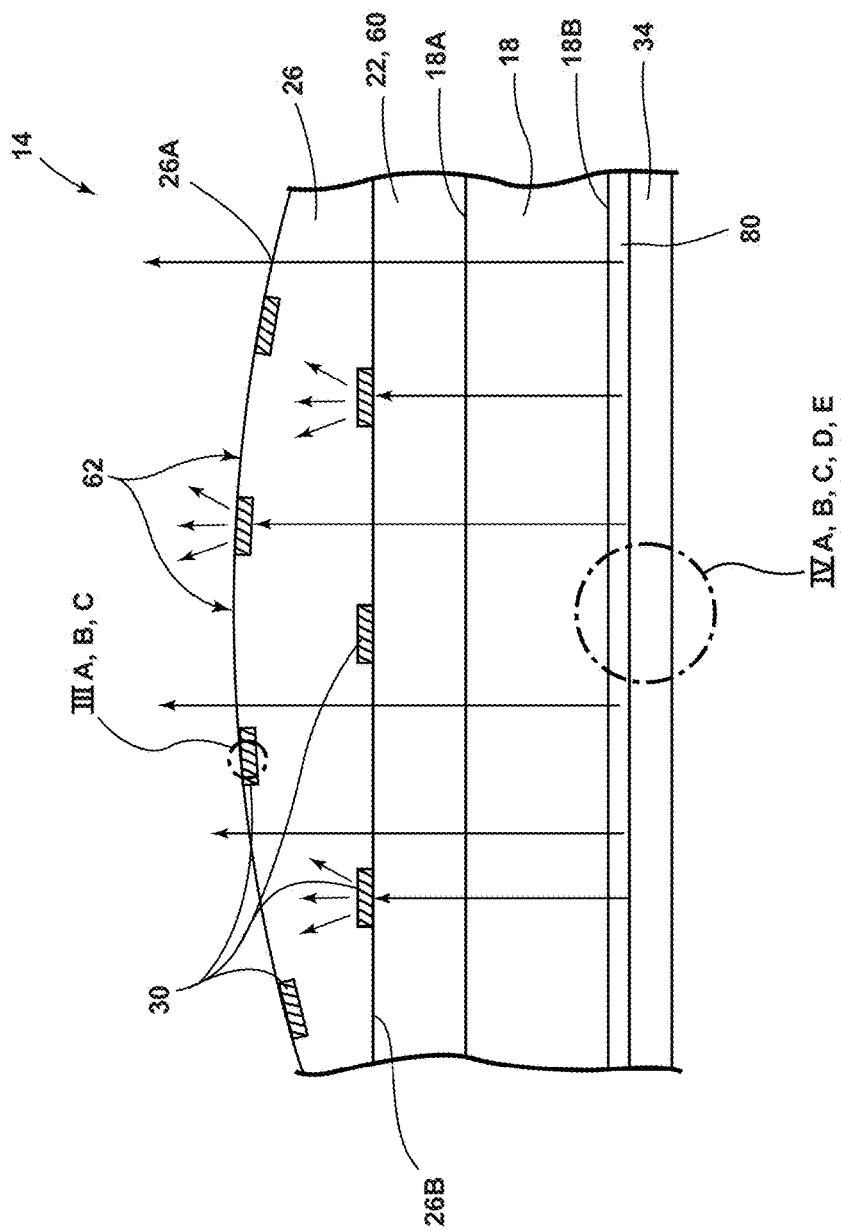
FIG. 2 is a cross-sectional view of an applique of the vehicle taken at line II-II, according to one embodiment.

Referring now to FIG. 2, the substrate 18 may be a polymeric, metallic, or ceramic material. In polymeric examples, the substrate 18 may include acyclic, acrylonitrile butadiene styrene, nylon, polylactic acid, polycarbonate, polyether sulfone, polyethylene, polypropylene, polyvinyl chloride, a liquid crystal polymer, cyclo-olefin copolymer, other thermoplastic materials, thermoset materials and combinations thereof. The substrate 18 may include a colorant (e.g., to color or filter the light passing through or reflecting off the substrate 18), an ultra violet inhibitor or blocker (e.g., a hindered amine or benzoyl), or infrared blocking material (e.g., aluminosilicates and/or metal oxides). The substrate 18 may be opaque, translucent, substantially transparent, or transparent. It will be understood that portions of the substrate 18 may be opaque and/or translucent (e.g., around the indicium 60), while other portions of the substrate 18 may be substantially transparent or transparent (e.g., under the indicium 60). In yet other embodiments, the substrate 18 may be light diffusing or include light diffusing structures (e.g., light scattering sites).

In some embodiments, the substrate 18 may be prepared by dispersing one or more persistent phosphorescent materials in a polymer matrix to form a homogenous mixture using a variety of methods. For example, the substrate 18 may be rendered by dispersing the phosphorescent materials into a solid state solution (homogenous mixture in a dry state) that may be incorporated in a polymer matrix formed by extrusion, injection molding, compression molding, calendaring, thermoforming, etc. Additionally or alternatively, a phosphorescent film, which includes a persistent phosphorescent material, may be disposed on the substrate 18 (e.g., on the first or second surfaces 18A, 18B), in the decorative layer 22 and/or in the over-mold 26. In layer examples, phosphorescent materials can be applied via painting, screen printing, flexography, spraying, slot coating, dip coating, roller coating, bar coating, and/or any other methods known in the art.

The persistent phosphorescent materials may be defined as being able to store an activation emission and release light gradually (i.e., a perceptible glow), for a period of several minutes or hours, once the activation emission is no longer present. The decay time may be defined as the time between the end of excitation from the activation emission and the moment when the light intensity of the phosphorescent material drops below a minimum visibility of 0.32 mcd/m$^2$. A visibility of 0.32 mcd/m$^2$ is roughly 100 times the sensitivity of the dark-adapted human eye, which corresponds to a base level of illumination commonly used by persons of ordinary skill in the art.

The persistent phosphorescent material, according to one example, may be operable to emit light at or above an intensity of 0.32 mcd/m$^2$ after a period of 10 minutes. Additionally, the persistent phosphorescent material may be operable to emit light above or at an intensity of 0.32 mcd/m$^2$ after a period greater than 30 minutes, greater than 60 minutes, greater than 2 hours, greater than 5 hours, greater than 10 hours or greater than 24 hours. Accordingly, the persistent phosphorescent material may continually illuminate in response to excitation through a plurality of excitation sources emitting an activation emission, including, but not limited to, ambient light (e.g., the sun) and/or any other light source disposed onboard or exterior to the vehicle 10 (e.g., the light source 34). The periodic absorption of the activation emission from the excitation sources may provide for a substantially sustained charge of the persistent phosphorescent materials to provide for a consistent passive illumination. In some embodiments, a light sensor may monitor the light illumination intensity of the phosphorescent material and initiate an excitation source (e.g., light from the light source 34) when the illumination intensity falls below 0.32 mcd/m$^2$, or any other predefined intensity level.

The persistent phosphorescent materials may correspond to alkaline earth aluminates and silicates, for example, doped di-silicates, or any other compound that is capable of emitting light for a period of time once an activation emission is no longer present. The persistent phosphorescent materials may be doped with one or more ions, which may correspond to rare earth elements, for example, $Eu^{2+}$, $Tb^{3+}$ and $Dy^{3+}$. The polymeric material of the substrate 18 may include between about 0.1% to about 25.0% of the persistent phosphorescent material either by weight or mole fraction. In embodiments utilizing the phosphorescent film on the substrate 18, the film may include a phosphorescent material in the range of about 30% to about 55%, a liquid carrier medium in the range of about 25% to about 55%, a polymeric resin in the range of about 15% to about 35%, a stabilizing additive in the range of about 0.25% to about 20%, and performance-enhancing additives in the range of about 0% to about 5%, each based on the weight of the formulation.

The phosphorescent material, according to one embodiment, may be a translucent white color when unilluminated. Once the phosphorescent material receives the activation emission of a particular wavelength, the phosphorescent material may emit white light, blue light, red light, green light or combinations thereof therefrom. The light emitted from the phosphorescent material, and, thereby, the applique 14 (FIG. 1A) and/or indicium 60 (FIG. 1B), may be of a desired brightness, such that the applique 14 is visible. According to one example, the blue emitting phosphorescent material may be $Li_2ZnGeO_4$ and may be prepared by a high temperature solid-state reaction method or through any other practicable method and/or process. The blue afterglow may last for a duration of two to eight hours and may originate from an activation emission and d-d transitions of $Mn^{2+}$ ions.

According to an alternate example, 100 parts of a commercial solvent-borne polyurethane, such as Mace resin 107-268, having 50% solids polyurethane in Toluene/Isopropanol, 125 parts of a blue green long persistent phosphor, such as Performance Indicator PI-BG20, and 12.5 parts of a dye solution containing 0.1% Lumogen Yellow F083 in dioxolane, may be blended to yield a low rare earth mineral phosphorescent film or be used in the substrate 18. It will be understood that the compositions provided herein are non-limiting examples. Thus, any phosphor known in the art may be utilized as a phosphorescent material or structure without departing from the teachings provided herein. Moreover, it is contemplated that any long persistent phosphor known in the art may also be utilized without departing from the teachings provided herein.

According to yet another example, the substrate 18 may include a plurality of phosphorescent materials configured to emit a plurality of different colored lights. The different colored emissions allow for a wide variety of colors to be generated (e.g., via color mixing). Additionally, the different colored emissions may be separated via the diffraction gratings 30 of the over-mold 26, as explained in greater detail below. Such separation may provide an iridescent appearance.

Additional information regarding the production of long persistence luminescent materials is disclosed in U.S. Pat. No. 8,163,201 to Agrawal et al., entitled "HIGH-INTENSITY, PERSISTENT PHOTOLUMINESCENT FORMULATIONS AND OBJECTS, AND METHODS FOR CREATING THE SAME," issued Apr. 24, 2012, the entire disclosure of which is incorporated herein by reference. For additional information regarding long persistent phosphorescent structures, refer to U.S. Pat. No. 6,953,536 to Yen et al., entitled "LONG PERSISTENT PHOSPHORS AND PERSISTENT ENERGY TRANSFER TECHNIQUE," issued Oct. 11, 2005; U.S. Pat. No. 6,117,362 to Yen et al., entitled "LONG-PERSISTENCE BLUE PHOSPHORS," issued Sep. 12, 2000; and U.S. Pat. No. 8,952,341 to Kingsley et al., entitled "LOW RARE EARTH MINERAL PHOTOLUMINESCENT COMPOSITIONS AND STRUCTURES FOR GENERATING LONG-PERSISTENT LUMINESCENCE," issued Feb. 10, 2015, all of which are incorporated herein by reference in their entirety.

Additionally or alternatively, the substrate 18, phosphorescent film and/or decorative layer 22 may be mixed with or include a structure including one or more photoluminescent materials. Such photoluminescent materials may have energy converting elements with phosphorescent or fluorescent properties. For example, the photoluminescent material may include organic or inorganic fluorescent dyes including rylenes, xanthenes, porphyrins, and phthalocyanines, or combinations thereof. Additionally or alternatively, the photoluminescent material may include phosphors from the group of Ce-doped garnets such as YAG:Ce. The photoluminescent material may be formulated to have a Stokes shift resulting in the conversion of visible or non-visible light into visible light having an emission spectrum expressed in a desired color, which may vary per lighting application. Such photoluminescent material may have a limited persistence (e.g., less than about 10 minutes, less than about 5 minutes, less than about 1 minute, or no human perceivable persistence).

Referring again to FIG. 2, the decorative layer 22 may be positioned on the first surface 18A of the substrate 18. It will be understood that the decorative layer 22 may be positioned on the second surface 18B of the substrate 18 without departing from the teachings provided herein. The decorative layer 22, as explained above, may define the indicium 60. The indicium 60 may be embossed, textured, engraved, or otherwise modified in thickness to produce the indicium 60. It will be understood that the decorative layer 22 may be raised or lowered and will not produce the indicium 60. In raised and/or lowered embodiments of the decorative layer 22, such raising and lowering may provide visual depth to the decorative layer 22. The indicium 60 may be raised or lowered relative to the rest of the decorative layer 22. The indicium 60 may include a symbol, alpha numeric text, a picture, a number, or a combination thereof. The decorative layer 22 may define one or more discrete indicium 60 (e.g., multiple separate indicia 60 spaced across the decorative layer 22). The decorative layer 22 may be opaque, partially transmissive, translucent, or transparent. Further, different portions of the decorative layer 22 may have different light transmission properties (e.g., a first portion may be opaque or translucent while another portion may be transparent or substantially transparent). The decorative layer 22 may be a polymeric material, a metal, or combinations thereof. In some examples, the decorative layer 22 may be a metal or metallic foil. In metallic examples of the decorative layer 22, the decorative layer may have a luster or shine configured to reflect light. In polymeric examples of the decorative layer 22, the decorative layer 22 may have a vacuumized metal surface configured to reflect light. The decorative layer 22 may be painted, or otherwise colored or dyed, to produce aesthetically pleasing colors. Additionally or alternatively, the decorative layer 22 may provide a textured appearance to the applique 14. For example, the decorative layer 22 may appear as wood grain, brushed metal (e.g., aluminum and/or nickel), satin nickel, chrome, vacuumized metal, leather, vinyl, or other textured appearances which may be aesthetically pleasing.

Positioned on, over and/or across the decorative layer 22 and the first surface 18A of the substrate 18 is the over-mold 26. The over-mold 26 may define a first surface 26A (e.g., an A-surface) and a second surface 26B (e.g., a B-surface). The over-mold 26 may have a transparency to light in a visible spectrum (e.g., about 400 nm to about 700 nm) of greater than about 50%, 60%, 70%, 80%, 90% or 99%. The over-mold 26 may be composed of silicone, polyisoprene, polybutadiene, chloroprene, butyl rubber, nitrile rubber, fluorosilicate, fluoroelastomers, ethylene vinyl acetate, other soft polymeric materials and/or combinations thereof. The over-mold 26 may have a thickness, or greatest diameter, of between about 0.01 mm to about 10.0 mm, or between about 0.25 mm to about 1.0 mm. In silicone examples, the over-mold 26 may have a density of about 1150 kg/m$^2$. Use of the over-mold 26 may allow for the dampening or reduction of acoustical energy through the applique 14. For example, use of the over-mold 26 on the substrate 18 may allow for an acoustic power reduction through the applique 14 of greater than about 1 dB, 5 dB, 10 dB, or greater than 20 dB. In some examples, the over-mold 26 may include a colorant (e.g., to color or filter the light passing through or being reflected off of the applique 14), an ultra violet inhibitor or blocker (e.g., a hindered amine or benzoyl), or infrared blocking material (e.g., aluminosilicates and/or metal oxides). Further, use of the over-mold 26 provides a protective layer to the applique 14 and/or the interior or exterior surface to which the applique 14 is applied. The over-mold 26 may create a slick and hydrophobic surface which may repel rain, oils, road grime, or other contaminants found in and around the interior and exterior of the vehicle 10 which will allow the applique 14 to stay cleaner. The applique 14 may have a viscoelasticity (i.e., having both viscosity and elasticity), a low Young's modulus, and/or a high failure strain compared with other materials, so that the over-mold 26 may protect the applique 14 and/or vehicle 10 when contact is made thereto (i.e., to prevent scratches, protect against impact, reduce vibration, etc.). Further, the viscoelasticity, low Young's modulus, and/or a high failure strain, may provide a soft, elegant feel to the applique 14 which may make it pleasing to touch, feel or rest appendages on.

The over-mold 26 may define one or more textures on the first surface 26A. For example, the first surface 26A may define a leather, wood grain, smooth, abrasive, and/or other texture. Such a textured surface may provide the "feel" to the appearance the decorative layer 22 provides. For example, if the decorative layer 22 visually provides a leather appearance, the textured surface of the over-mold 26 may have a leather texture (e.g., grains and ridges) such that a user of the applique 14 receives the expected tactile stimulation from the over-mold 26 as they expect from the appearance of the applique 14. In another example, the decorative layer 22 may provide a chrome appearance while the first surface 26A of the over-mold 26 provides a smooth texture surface similar to chrome. It will be understood that the appearance and tactile stimulation provided may differ from one another without departing from the teachings provided herein.

Still referring to FIG. 2, the first surface 26A of the over-mold 26 may have a generally curved shape, as depicted, or may have a square, rectangular, polygonal, undulating, or other complex shape. For example, one or more of the first and second surfaces 26A, 26B of the over-mold 26 may be faceted, non-planar, curved or characterized by other shapes. Further, the first and second surfaces 26A, 26B can be characterized with portions having planar features and portions having non-planar features. As shown in FIG. 2, for example, over-mold 26 has a curved first surface 26 defining diffraction gratings 30 as viewed in the cross-section, while having some curved portions in forming the overall design of the applique.

The over-mold 26 may define a plurality of spaces 62 between the diffraction gratings 30 of the first and second surfaces 26A, 26B which remain substantially transparent to ambient light, phosphorescent light from the substrate 18 and/or the light source 34. The spaces 62 allow ambient light to penetrate the over-mold 26 to charge the phosphorescent material and to diffract off of the diffraction gratings 30 positioned on the second surface 26B of the over-mold 26. Further, the spaces 62 allow light emitted by the charged phosphorescent material and the light source 34 to be emitted from the over-mold 26. Such an effect may be advantageous in providing colored light to an already iridescent image produced by the diffraction gratings 30. Further, each of the plurality of diffraction gratings 30 may have a different period, range of periods, and/or shape, such that the iridescence of the applique 14 appears random and more jewel like. The spaces 62 and the diffraction gratings 30 may be strategically positioned along the first and second surfaces 26A, 26B to cooperate with the shape of the first and second surfaces 26A, 26B to create a more jewel-like appearance.

Figure 3A:
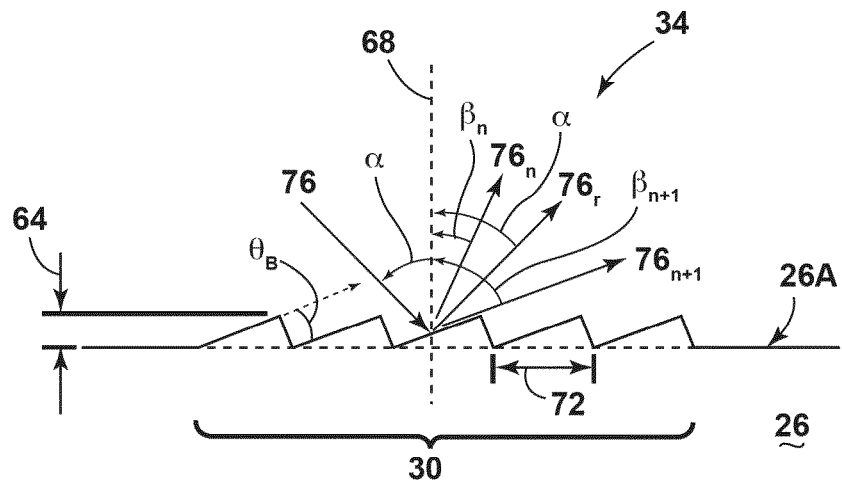
FIG. 3A is an enhanced view taken at section IIIA of FIG. 2, according to one embodiment.
Figure 3B:
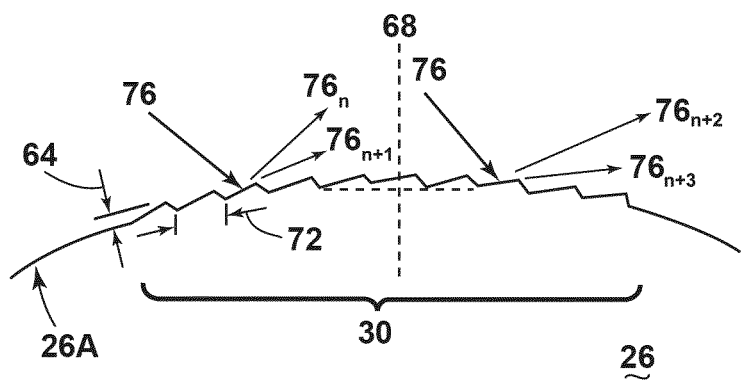
FIG. 3B is an enhanced view taken at section IIIB of FIG. 2, according to one embodiment.

Referring now to FIGS. 3A and 3B, the diffraction grating 30 is configured to produce an iridescent pattern to light impinging upon it. The diffraction grating 30 may be present on a flat embodiment of the first surface 26A (FIG. 3A) on a curved embodiment of the first surface 26A (FIG. 3B), or on other shapes of the first surface 26A. For example, the diffraction grating 30 may be configured to reflect light of different wavelengths in different directions. The diffraction grating 30 may have a thickness 64 that ranges from about 250 nm to about 1000 nm. The thickness 64 of the diffraction grating 30, for example, should be maintained in the range of about 250 nm to about 1000 nm to ensure that the applique exhibits a jewel-like appearance through light diffraction upon illumination in direct ambient lighting while also having a minimal effect on the optical clarity of the applique under non-direct ambient lighting. Preferably, the thickness 64 of the diffraction grating 30 ranges from about 390 nm to 700 nm. In other embodiments, the thickness 64 of the diffraction gratings 30 ranges from 500 nm to 750 nm. As depicted in FIG. 3A in exemplary form, the diffraction grating 30 may have a sawtooth or triangular shape. In three dimensions, these gratings 30 can appear with a stepped or sawtooth shape without angular features, pyramidal in shape, or some combination of stepped and pyramidal shapes. Other shapes of the diffraction grating 30 include hill-shaped features (e.g., sinusoidal or curved shaped features). The diffraction grating 30 can also include portions with a combination of triangular and hill-shaped features. More generally, the shapes of the grating 30 should be such that an effective blazing angle $\theta_B$ of at least 15 degrees is present for one or more portions of each grating, tooth or groove of the diffraction grating 30. The blaze angle $\theta_B$ is the angle between step normal (i.e., the direction normal to each step or tooth of the grating 30) and a direction normal 68 to the first surface 26A having the grating 30.

Generally, the blaze angle $\theta_B$ is optimized to maximize the efficiency of the wavelength(s) of the incident light which may be typical ambient sunlight, light from the phosphorescent material or light from the light source 34, to ensure that maximum optical power is concentrated in one or more diffraction orders while minimizing residual power in other orders (e.g., the zeroth order indicative of the ambient light itself). An advantage of situating the diffraction gratings 30 on planar portions or aspects of the first and second surfaces 26A, 26B of the over-mold 26 is that a constant blaze angle $\theta_B$ and a period 72 will result in consistent reflected and diffracted light produced from the diffraction grating.

The diffraction grating 30 of the applique 14 may be characterized by one or more periods 72 (also known as d in the standard nomenclature of diffraction gratings). In most aspects of the applique 14, the period 72 of the diffraction grating 30 is maintained between about 50 nm and about 5 microns. In general, the maximum wavelength that a given diffraction grating 30 can diffract is equal to about twice the period 72. Hence, a diffraction grating 30 with a period 72 that is maintained between about 50 nm and about 5 microns can diffract light in an optical range of 100 nm to about 10 microns. In a preferred embodiment, the period 72 of a diffraction grating 30 is maintained from about 150 nm to about 400 nm, ensuring that the diffraction grating 30 can efficiently diffract light in an optical range of about 300 nm to about 800 nm, roughly covering the visible spectrum.

Incident light 76 (typically ambient, sun light and the phosphorescent light) at an incident angle α is directed against a sawtooth-shaped diffraction grating 30 having a thickness 64, a period 72 and a blaze angle $\theta_B$. More particularly, a portion of the incident light 76 (preferably, a small portion) striking the diffraction grating 30 at an incident angle α is reflected as reflected light 76r at the same angle α, and the remaining portion of the incident light 76 is diffracted at particular wavelengths corresponding to diffracted light 76n, 76n+1, etc., at corresponding diffraction angles βn, βn+1, etc. The reflected light 76r is indicative of the zeroth order (i.e., n=0) and the diffracted light 76, $76_{n+1}$, $76_{n+2}$ are indicative of the nth order diffraction according to standard diffraction grating terminology, where n is an integer corresponding to particular wavelengths of the reflected or diffracted light.

Figure 3C:
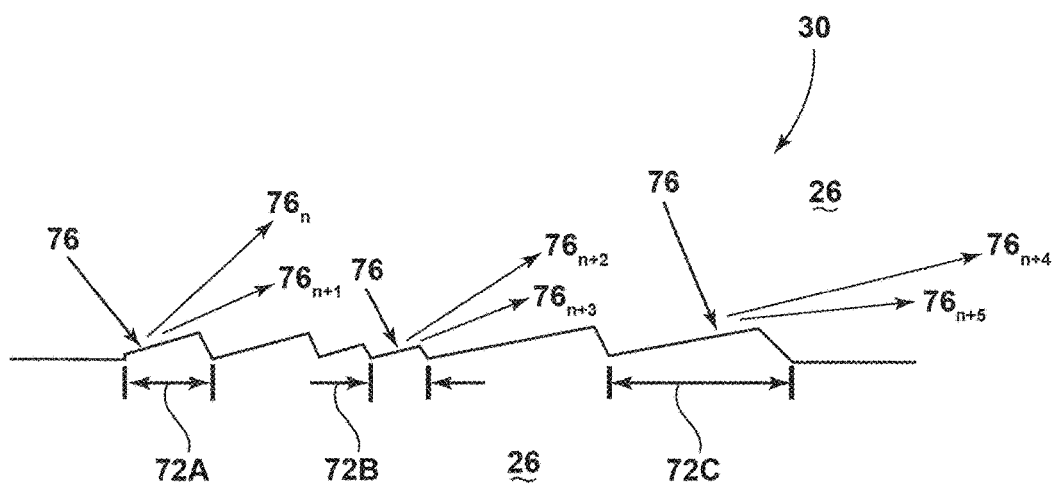
FIG. 3C is an enhanced view taken at section IIIC of FIG. 2, according to one embodiment.

Referring now to FIG. 3C, an example of the diffraction grating 30 employing varying periods (e.g., as including a set of periods) that can be employed in iridescent appliques 14 depicted in a cross-sectional form, according to an aspect of the disclosure. In the depicted example, the diffraction grating 30 can have two or more sets of teeth or grooves, each having a particular period 72 that can produce light at unique or differing diffraction orders. As shown, the grating 30 is configured with three periods—period 72A, period 72B, and period 72C. One set of teeth of the diffraction grating 30 with a period of 72A can produce diffracted light $76_n$ and $76_{n+1}$, a different set of teeth with a period of 72B can produce diffracted light $76_{n+2}$ and $76_{n+3}$, and a third set of teeth with a period of 72C can produce diffracted light $76_{n+4}$ and $76_{n+5}$, all from the same incident light 76. Consequently, the diffraction grating 30, whether employed on first or second surfaces 26A, 26B (FIG. 2) of the applique 14, (FIG. 2) advantageously can produce jewel-like effects of widely varying wavelengths within various regions of the applique 14.

In some aspects, the diffraction grating 30 includes a varying period that varies between two to ten discrete values or, more preferably, between two to five discrete values across the diffraction grating 30. According to another aspect, the diffraction grating 30 with varying periods can be employed in one or more portions of the first and/or second surfaces 26A, 26B of the over-mold 26, and one or more diffraction gratings 30 having a constant period are employed in other portions of the first and/or second surfaces 26A, 26B of the applique 14 to create interesting, jewel-like appearance effects produced by the applique 14 employing the gratings. In another example, the diffraction grating 30 includes a varying period that changes between any number of values, only limited by the overall length of the grating 30 and/or the processing capabilities to develop such variability through precise control of mold dimensions. In another embodiment there may be a plurality of diffractions gratings 30 in a spaced apart configuration across the first and/or second surfaces 26A, 26B of the applique 14. In such an embodiment, the plurality of diffraction gratings 30 may have the same or a different period. In yet another embodiment, the diffraction grating(s) 30 may substantially cover the first and/or second surfaces 26A, 26B. In examples where diffraction gratings 30 are present on the second surface 26B, the diffraction taking place on the second surface 26B may provide an aesthetically pleasing "depth" to the applique 14.

In some examples, optional coatings may be applied over the first surface 26A of the over-mold 26. For example, an optically clear sealing layer (e.g., a polyurethane seal) can be applied over such exterior surfaces to add further mechanical and/or ultraviolet light protection to the applique 14, particularly to any diffraction gratings 30 included in the first surface 26A. Advantageously, the addition of a relatively thin protective coating can protect the diffraction gratings while retaining the benefits of locating the grating on the first surface 26A of the applique 14 in terms of diffraction efficiency and the overall iridescence obtained by the applique 14.

According to another aspect of the disclosure, a method of making an iridescent member (e.g., applique 14) is provided that includes a step of forming a mold with mold surfaces corresponding to the components of the iridescent member (e.g., substrate 18, the light source 34 and the over-mold 26). In a first example, a single mold may be utilized which is capable of variable amounts of mold surface separation such that the substrate 18 and the over-mold 26 may be formed in different shots. In another example, the iridescent member may be formed in two different molds (e.g., a first mold to form the substrate 18 and a second mold to apply the over-mold 26 to the substrate 18). In yet another embodiment, the over-mold 26 and the substrate 18 may be formed independent of one another and later adhered to one another (e.g., via glue or another adhesive). In any event, the mold is formed for this step from metals or metal alloys sufficient to withstand the temperatures and environmental conditions associated with injection molding the iridescent member or its components.

Next, the method of forming the iridescent member includes a step of ablating at least one of the mold surfaces to form one or more diffraction grating mold surfaces. For example, the ablating step is conducted to form one or more diffraction patterns (e.g., diffraction grating 30) on the mold surfaces intended to be incorporated in portions of the exterior of the iridescent member (e.g., applique 14). In a preferred example, the ablating step is conducted with a laser ablation process. Laser ablation processes, e.g., employing an AgieCharmilles Laser cutting apparatus from Georg Fischer Ltd., are particularly adept at developing the diffraction pattern mold surfaces in the mold given their ability to precisely ablate microscopic features into metal and metal alloy mold surfaces. The diffraction grating 30 may be formed in one or more patterns on the mold surface.

Referring again to the method of making the iridescent member, the method may also include a step of forming a component (e.g., the substrate 18) of the iridescent member (e.g., applique 14). The component may be formed according to known injection molding techniques employed by those skilled in the field.

Next, a step of over-molding a liquid polymer over the component may be performed. The over-molding liquid polymer may have a viscosity of less than about 2000 pa·s, less than about 1000 pa·s, or less than about 100 pa·s when over-molded onto the component such that the liquid polymer penetrates the diffraction grating. The diffraction pattern (e.g., diffraction grating 30) may have a thickness from 250 nm to 1000 nm and a period from 50 nm to 5 microns in the mold surface. Preferably, the forming of the member step is conducted with an injection molding process. In a preferred aspect, portions of the mold in proximity to the one or more diffraction grating mold surfaces are heated prior to and/or during the step of over-molding the liquid polymer. Adding additional heat to these portions of the mold serves to further reduce the viscosity of the polymeric material such that it can flow within the very small scale aspects of the diffraction grating mold surfaces.

Finally, a step of solidifying the liquid polymer (e.g., to form the over-mold 26) over the component (e.g., substrate 18) is performed (e.g., such that the over-mold 26 defines the diffraction grating 30 and one of the first and/or second surfaces 26A, 26B).

Referring again to FIG. 2, an adhesive layer 80 may be used to secure the light source 34 to the substrate 18. It will be understood that the adhesive layer 80 may also be used to secure the decorative layer 22 in place during the formation of the over-mold 26 and/or to secure the over-mold 26 to the substrate 18. The adhesive layer 80 may be a clear pressure sensitive adhesive. It will be understood that the adhesive layer 80 is optional.

Figure 4B:
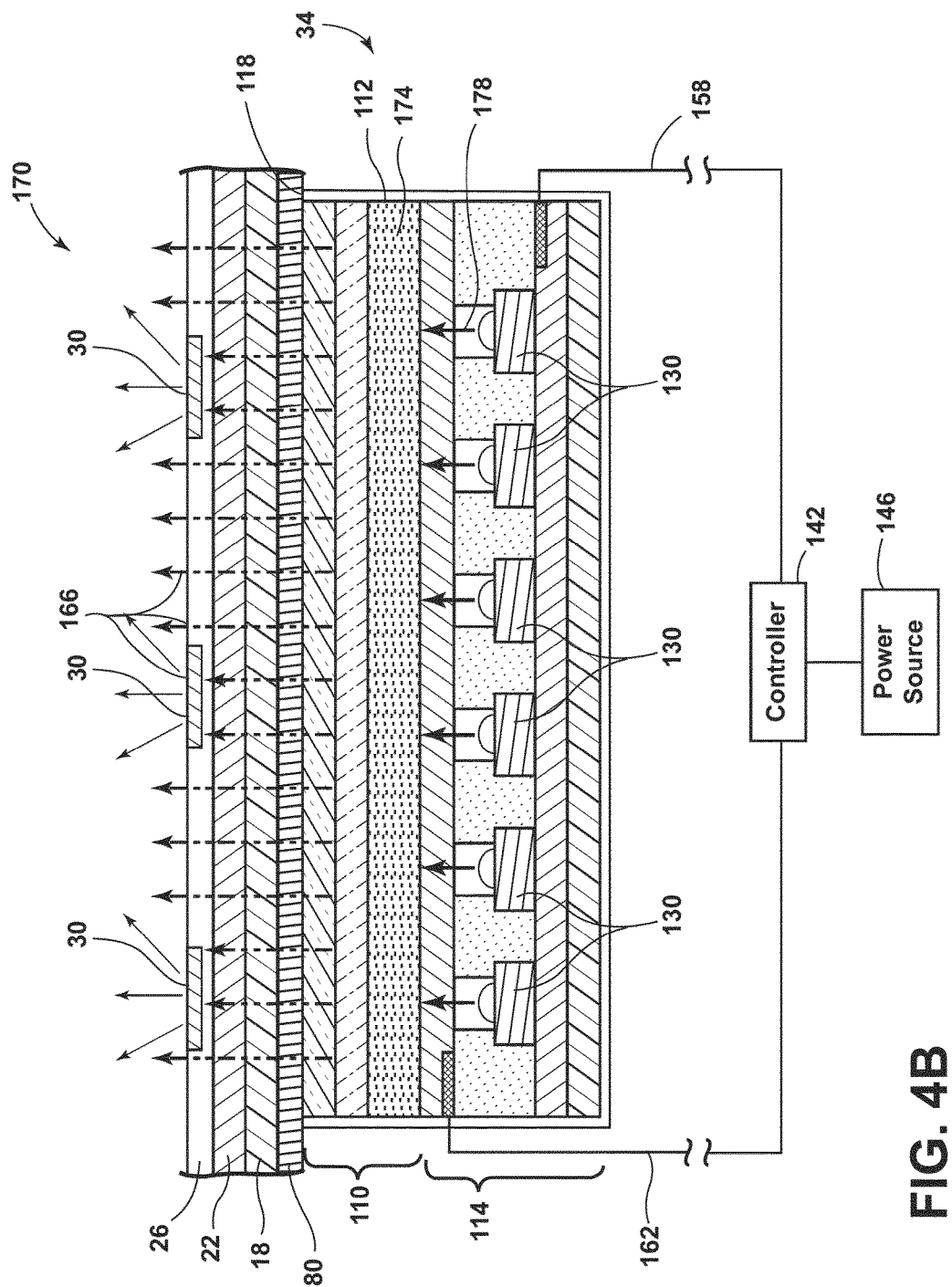
FIG. 4B is an enhanced view taken at section IV of FIG. 2, further illustrating the light assembly, according to one embodiment.

Referring to FIGS. 4A-4E, the light source 34 capable of use in the applique 14 (FIG. 2) with an external photoluminescent structure 110 is shown, according to various embodiments. As illustrated in FIG. 4A, the light source 34 may have a stacked arrangement that includes a light-producing assembly 114 and the photoluminescent structure 110.

The light-producing assembly 114 may correspond to a thin-film or printed light emitting diode (LED) assembly and includes a substrate 18 as its lowermost layer. The substrate 18 may include a polycarbonate, poly-methyl methacrylate (PMMA), or polyethylene terephthalate (PET) material on the order of 0.005 to 0.060 inches thick and is arranged over the intended vehicle substrate on which the light source 34 is to be received. Alternatively, as a cost saving measure, the substrate 18 may directly correspond to a preexisting structure (e.g., exterior or interior panel of the vehicle 10).

The light-producing assembly 114 includes a positive electrode 126 arranged over the substrate 18. The positive electrode 126 includes a conductive epoxy such as, but not limited to, a silver-containing or copper-containing epoxy. The positive electrode 126 is electrically connected to at least a portion of a plurality of LED sources 130 arranged within a semiconductor ink 134 and applied over the positive electrode 126. Likewise, a negative electrode 138 is also electrically connected to at least a portion of the LED sources 130. The negative electrode 138 is arranged over the semiconductor ink 134 and includes a transparent or translucent conductive material such as, but not limited to, indium tin oxide. Additionally, each of the positive and negative electrodes 126, 138 are electrically connected to a controller 142 and a power source 146 via a corresponding bus bar 150, 154 and conductive leads 158, 162. The bus bars 150, 154 may be printed along opposite edges of the positive and negative electrodes 126, 138 and the points of connection between the bus bars 150, 154 and the conductive leads 158, 162 may be at opposite corners of each bus bar 150, 154 to promote uniform current distribution along the bus bars 150, 154. It should be appreciated that in alternate embodiments, the orientation of components within the light-producing assembly 114 may be altered without departing from the concepts of the present disclosure. For example, the negative electrode 138 may be disposed below the semiconductor ink 134 and the positive electrode 126 may be arranged over the aforementioned semiconductor ink 134. Likewise, additional components, such as the bus bars 150, 154, may also be placed in any orientation such that the light-producing assembly 114 may emit outputted light 166 (FIG. 4B) (e.g., the incident light 76) toward a desired location.

The LED sources 130 may be dispersed in a random or controlled fashion within the semiconductor ink 134 and may be configured to emit focused or non-focused light toward the photoluminescent structure 110. The LED sources 130 may correspond to micro-LEDs of gallium nitride elements on the order of about 5 to about 400 microns in size and the semiconductor ink 134 may include various binders and dielectric material including, but not limited to, one or more of gallium, indium, silicon carbide, phosphorous, and/or translucent polymeric binders.

The semiconductor ink 134 can be applied through various printing processes, including ink jet and silk screen processes, to selected portion(s) of the positive electrode 126. More specifically, it is envisioned that the LED sources 130 are dispersed within the semiconductor ink 134, and shaped and sized such that a substantial quantity of the LED sources 130 align with the positive and negative electrodes 126, 138 during deposition of the semiconductor ink 134. The portion of the LED sources 130 that ultimately are electrically connected to the positive and negative electrodes 126, 138 may be illuminated by a combination of the bus bars 150, 154, controller 142, power source 146, and conductive leads 158, 162. According to one embodiment, the power source 146 may correspond to a vehicular power source 146 operating at 12 to 16 VDC. Additional information regarding the construction of light-producing assemblies 114 is disclosed in U.S. Patent Publication No. 2014/0264396 A1 to Lowenthal et al. entitled "ULTRA-THIN PRINTED LED LAYER REMOVED FROM SUBSTRATE," filed Mar. 12, 2014, the entire disclosure of which is incorporated herein by reference.

Referring now to FIG. 4A, the photoluminescent structure 110 is arranged over the negative electrode 138 as a coating, layer, film or other suitable deposition. With respect to the presently illustrated embodiment, the photoluminescent structure 110 may be arranged as a multi-layered structure, including an energy conversion layer 112, optional stability layer 182, and optional protective layer 186, as described above.

The decorative layer 22 is arranged over the substrate 18, which is arranged over the photoluminescent structure 110. In some embodiments, the decorative layer 22 is molded over the photoluminescent structure 110 and light-producing assembly 114. As explained above, the decorative layer 22 may be at least partially light transmissible. In this manner, the decorative layer 22 will be illuminated by the photoluminescent structure 110 whenever an energy conversion process is underway.

An overmold material 118 is disposed around the light-producing assembly 114 and/or photoluminescent structure 110. The overmold material 118 may protect the light-producing assembly 114 from physical and chemical damage arising from environmental exposure. The overmold material 118 may have viscoelasticity (i.e., having both viscosity and elasticity), a low Young's modulus, and/or a high failure strain, compared with other materials, so that the overmold material 118 may protect the light-producing assembly 114 when contact is made thereto. For example, the overmold material 118 may protect the light-producing assembly 114 from the environmental contaminants, such as dirt and water, which may come in contact with the light source 34 during manufacturing. The overmold material 118 may be the same material as the over-mold 26 and optionally formed at the same time.

In some embodiments, the photoluminescent structure 110 may be employed separate and away from the light-producing assembly 114. For example, the photoluminescent structure 110 may be positioned on a vehicle interior side of the decorative layer 22 (e.g., on the second surface 26B of the over-mold 26). It will also be understood that in embodiments where the photoluminescent structure 110 is incorporated into distinct components separated from the light source 34, the light source 34 might still have the same or similar structure to the light source 34 described in reference to FIG. 4A.

Referring now to FIG. 4B, the energy conversion process 170 for producing single color luminescence is illustrated, according to one embodiment. For purposes of illustration, the energy conversion process 170 is described below using the light source 34 depicted in FIG. 4A. In this embodiment, the energy conversion layer 112 of the photoluminescent structure 110 includes the single photoluminescent material 174, which is configured to convert inputted light 178 received from LED sources 130 into the outputted light 166 having a wavelength different than that associated with the inputted light 178. More specifically, the photoluminescent material 174 is formulated to have an absorption spectrum that includes the emission wavelength of the inputted light 178 supplied from the LED sources 130. The photoluminescent material 174 is also formulated to have a Stokes shift resulting in the converted visible outputted light 166 having an emission spectrum expressed in a desired color, which may vary per lighting application. The converted visible outputted light 166 is outputted from the light source 34 via the decorative layer 22, thereby causing the decorative layer 22 to illuminate in the desired color. The illumination provided by the decorative layer 22 may offer a unique, substantially uniform, and/or attractive, viewing experience that may be difficult to duplicate through non-photoluminescent means.

Figure 4C:
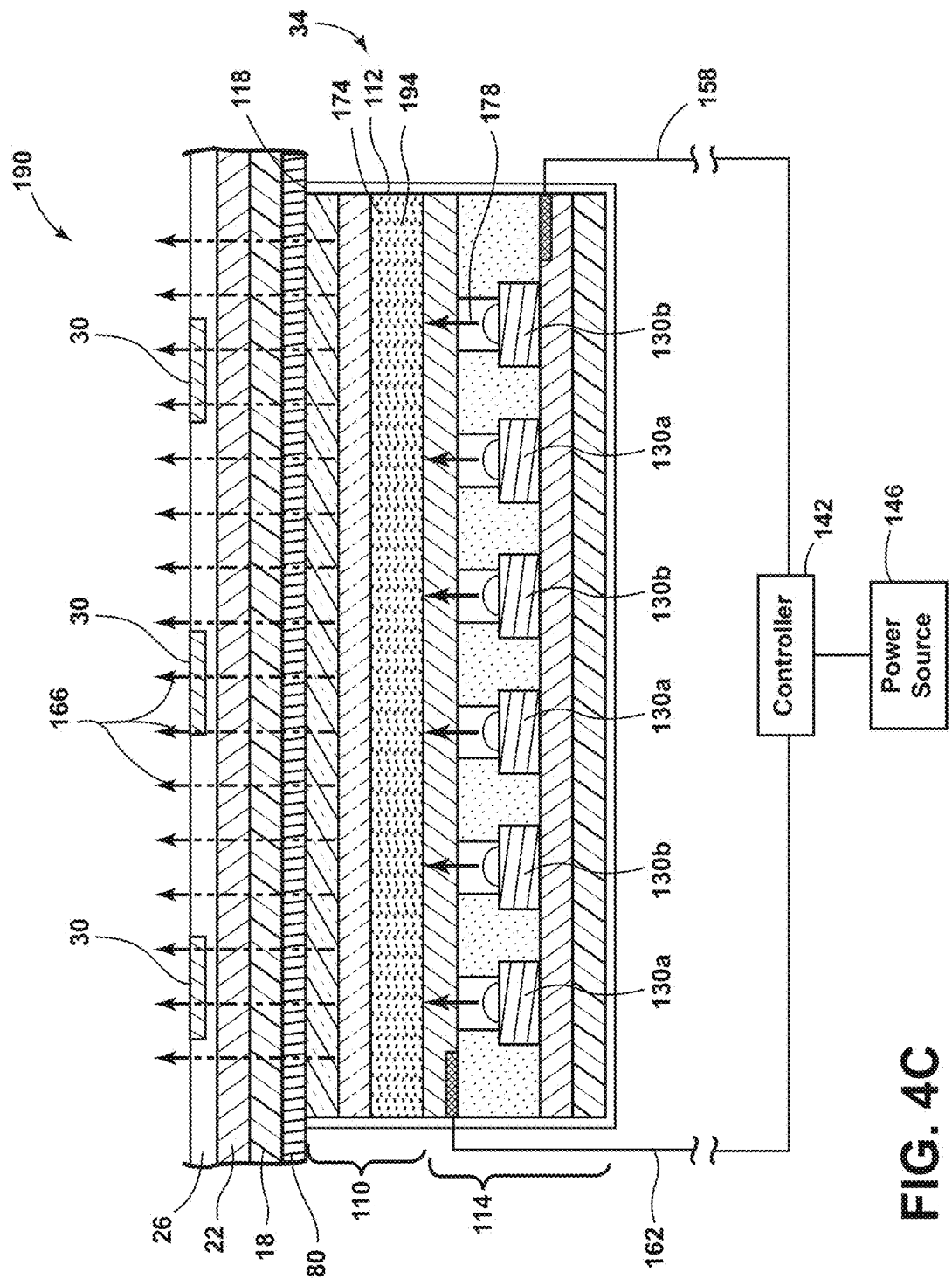
FIG. 4C is an enhanced view taken at section IV of FIG. 2, illustrating an alternate light assembly, according to one embodiment.

Referring to FIG. 4C, a second energy conversion process 190 for generating multiple colors of light is illustrated, according to one embodiment. For consistency, the second energy conversion process 190 is also described below using the light source 34 depicted in FIG. 4A. In this embodiment, the energy conversion layer 112 includes the first photoluminescent material 174 and a second photoluminescent material 194 that are interspersed within the energy conversion layer 112. Alternatively, the photoluminescent materials 174, 194 may be isolated from each other, if desired. Also, it should be appreciated that the energy conversion layer 112 may include more than two different photoluminescent materials 174 and 194, in which case, the teachings provided below similarly apply. In one embodiment, the second energy conversion process 190 occurs by way of down conversion using blue, violet, and/or UV light as the source of excitation.

With respect to the presently illustrated embodiment, the excitation of photoluminescent materials 174, 194 is mutually exclusive. That is, photoluminescent materials 174, 194 are formulated to have non-overlapping absorption spectrums and Stoke shifts that yield different emission spectrums. Also, in formulating the photoluminescent materials 174, 194, care should be taken in choosing the associated Stoke shifts such that the converted outputted light 166 emitted from one of the photoluminescent materials 174, 194, does not excite the other, unless so desired. According to one exemplary embodiment, a first portion of the LED sources 130, exemplarily shown as LED sources 130a, is configured to emit an inputted light 178 having an emission wavelength that only excites photoluminescent material 174 and results in the inputted light 178 being converted into a visible outputted light 166 of a first color (e.g., white). Likewise, a second portion of the LED sources 130, exemplarily shown as LED sources 130b, is configured to emit an inputted light 178 having an emission wavelength that only excites second photoluminescent material 194 and results in the inputted light 178 being converted into a visible outputted light 166 of a second color (e.g., red). Preferably, the first and second colors are visually distinguishable from one another. In this manner, LED sources 130a and 130b may be selectively activated using the controller 142 to cause the photoluminescent structure 110 to luminesce in a variety of designable colors. For example, the controller 142 may activate only LED sources 130a to exclusively excite photoluminescent material 174, resulting in the decorative layer 22 illuminating in the first color. Alternatively, the controller 142 may activate only LED sources 130b to exclusively excite the second photoluminescent material 194, resulting in the decorative layer 22 illuminating in the second color. Alternatively still, the controller 142 may activate LED sources 130a and 130b in concert, which causes both of the photoluminescent materials 174, 194 to become excited, resulting in the decorative layer 22 illuminating in a third color, which is a color mixture of the first and second colors (e.g., pinkish). The intensities of the inputted light 178 emitted from each portion of the LED sources 130a, 130b may also be proportionally varied to one another such that additional colors may be obtained. For energy conversion layers 112 containing more than two distinct photoluminescent materials 174, a greater diversity of colors may be achieved. Contemplated colors include red, green, blue, and combinations thereof, including white, all of which may be achieved by selecting the appropriate photoluminescent materials 174 and correctly manipulating the corresponding LED sources 130.

Figure 4D:
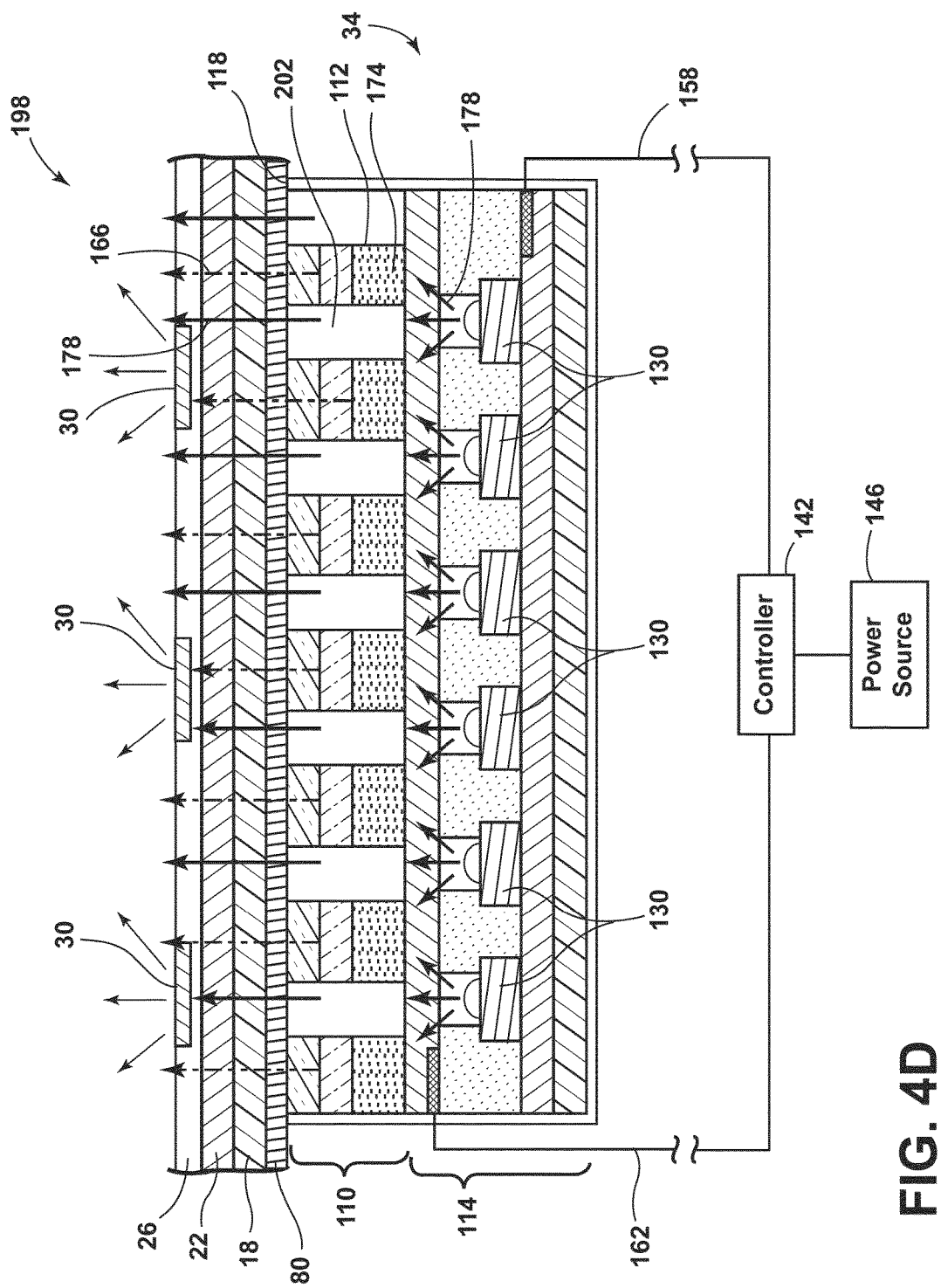
FIG. 4D is an enhanced view taken at section IV of FIG. 2, illustrating a light assembly having a luminescent structure separated by light transmissive portions disposed on the light source, according to another embodiment.

Referring to FIG. 4D, a third energy conversion process 198 includes a light-producing assembly 114, such as the one described in reference to FIG. 4A, and a photoluminescent structure 110 disposed thereon, according to an alternate embodiment. The photoluminescent structure 110 is configured to convert inputted light 178 received from LED sources 130 into a visible outputted light 166 having a wavelength different than that associated with the inputted light 178. More specifically, the photoluminescent structure 110 is formulated to have an absorption spectrum that includes the emission wavelength of the inputted light 178 supplied from the LED sources 130. The photoluminescent material 174 is also formulated to have a Stokes shift resulting in the converted visible outputted light 166 having an emission spectrum expressed in a desired color, which may vary per lighting application.

The photoluminescent structure 110 may be applied to a portion of the light-producing assembly 114, for example, in a stripped manner. Between the photoluminescent structures 110 may be light transmissive portions 202 that allow inputted light 178 emitted from the LED sources 130 to pass therethrough at the first wavelength. The light transmissive portions 202 may be an open space, or may be a transparent or translucent material. The inputted light 178 emitted through the light transmissive portions 202 may be directed from the light-producing assembly 114 towards the decorative layer 22 such that the decorative layer 22 may emit a colored light corresponding to the inputted light 178 that is directed through the light transmissive portions 202.

Figure 4E:
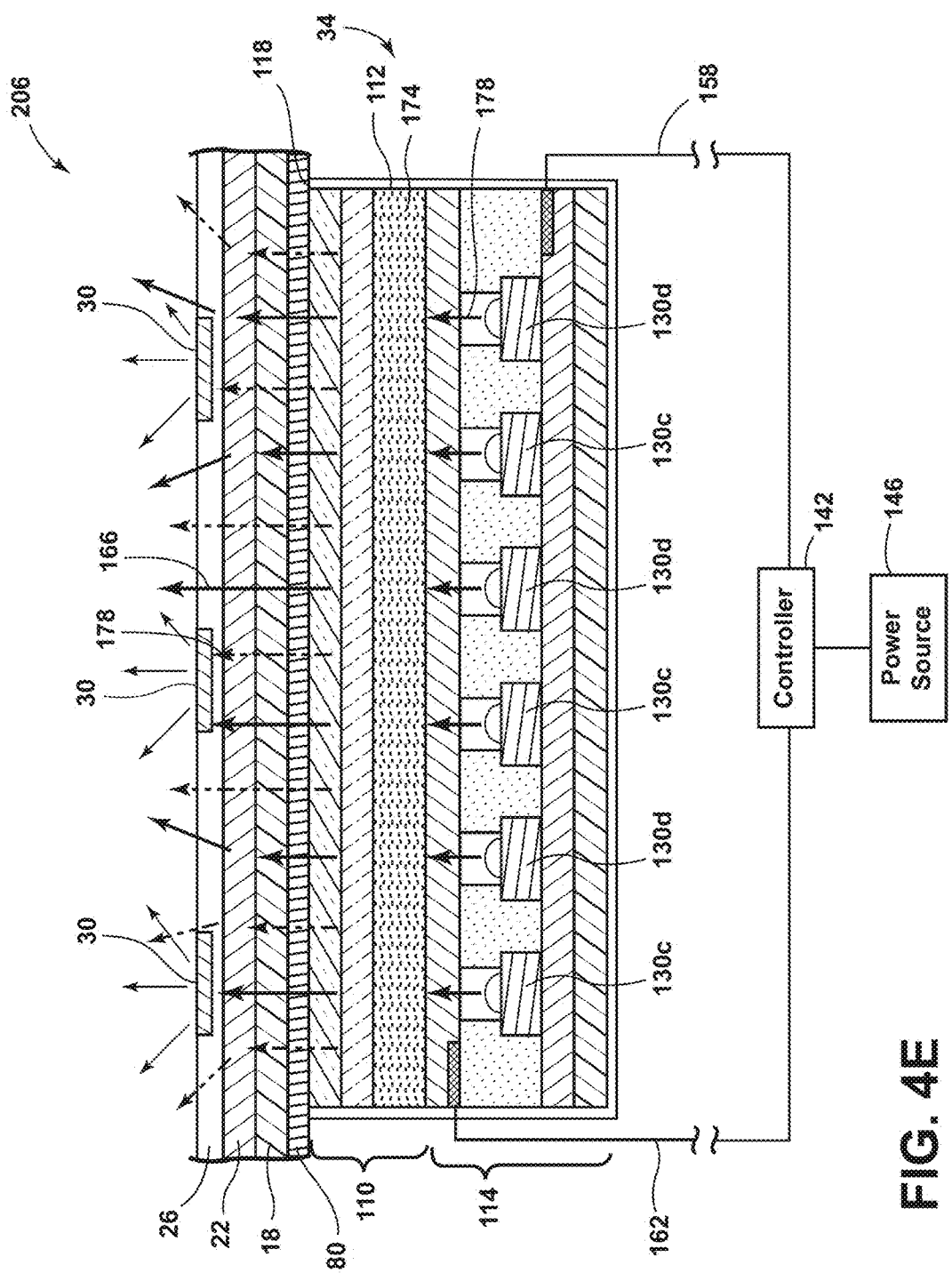
FIG. 4E is an enhanced view taken at section IV of FIG. 2 illustrating an alternate light source having a luminescent structure disposed on the light source configured to convert a portion of light emitted from the light source from a first wavelength to a second wavelength, according to one embodiment.

Referring to FIG. 4E, a fourth energy conversion process 206 for generating multiple colors of light utilizing the light-producing assembly 114, such as the one described in reference to FIG. 4A, and a photoluminescent structure 110 disposed thereon is illustrated. In this embodiment, the photoluminescent structure 110 is disposed over a top portion of the light-producing assembly 114. The excitation of photoluminescent material 174 is formulated such that a portion of inputted light 178 emitted from LED sources 130c, 130d passes through the photoluminescent structure 110 at the first wavelength (i.e., the inputted light 178 emitted from the light source 34 is not converted by the photoluminescent structure 110). The intensity of the emitted light (i.e., the combination of the inputted light 178 and outputted light 166) may be modified by pulse-width modulation or current control to vary the amount of inputted light 178 emitted from the LED sources 130c, 130d that pass through the photoluminescent structure 110 without converting to a second, outputted light 166 wavelength. For example, if the light source 34 is configured to emit inputted light 178 at a low level, substantially, all of the inputted light 178 may be converted to outputted light 166. In this configuration, a color of outputted light 166 corresponding to the photoluminescent structure 110 may be emitted from the light-producing assembly 114. If the light source 34 is configured to emit inputted light 178 at a high level, only a portion of the first wavelength may be converted by the photoluminescent structure 110. In this configuration, a first portion of the emitted light may be converted by the photoluminescent structure 110 and a second portion of the emitted light may be emitted from the light-producing assembly 114 at the first wavelength towards additional photoluminescent structures disposed proximately to the light source 34. The additional photoluminescent structures may luminesce in response to the inputted light 178 emitted from the light source 34.

According to one exemplary embodiment, a first portion of the LED sources 130, exemplarily shown as LED sources 130c, is configured to emit an inputted light 178 having a wavelength that excites the photoluminescent material 174 within the photoluminescent structure 110 and results in the inputted light 178 being converted into a visible outputted light 166 of a first color (e.g., white). Likewise, a second portion of the LED sources 130, exemplarily shown as LED sources 130d, are configured to emit an inputted light 178 having a wavelength that passes through the photoluminescent structure 110 and excites additional photoluminescent structures disposed proximately to the applique 14, thereby illuminating in a second color. The first and second colors may be visually distinguishable from one another. In this manner, LED sources 130c and 130d may be selectively activated using the controller 142 to cause the decorative layer 22 to luminesce in a variety of colors.

Figure 5:
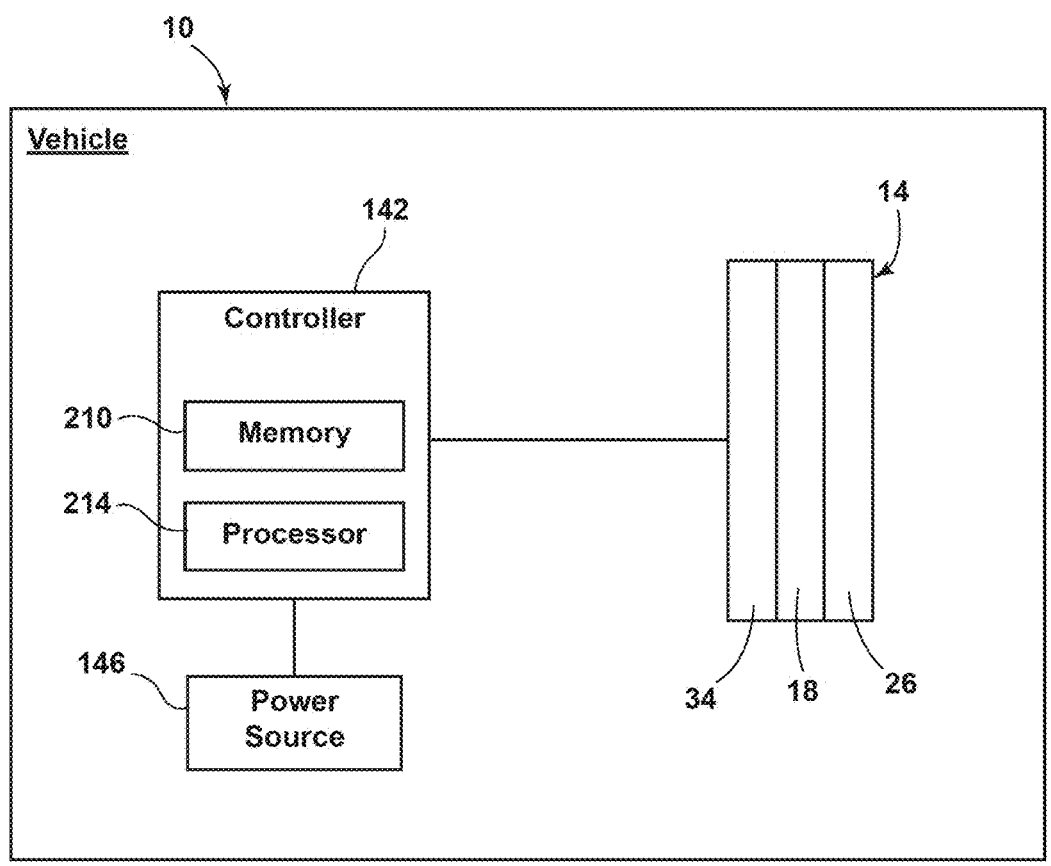
FIG. 5 is a block diagram of the vehicle and the lighting system.

Referring now to FIG. 5, a block diagram of the vehicle 10 is shown in which the decorative layer 22 (FIG. 2) is positioned within the applique 14. The vehicle 10 includes the controller 142 in communication with the light-producing assembly 114 (FIG. 4A). The controller 142 may include a memory 210 having instructions contained therein that are executed by a processor 214 of the controller 142. The controller 142 may provide electrical power to the light-producing assembly 114 via the power source 146 located onboard the vehicle 10. In addition, the controller 142 may be configured to control the light output of the light-producing assembly 114 based on feedback received from one or more vehicle control modules. The controller 142 may be configured to operate the LED sources 130 (FIGS. 4A-4E), the first portion of LEDs 130a and/or the second portion of LEDs 130b separately and/or in an alternating manner (e.g., via current direction manipulation) in order to achieve a specific lighting appearance for the applique 14. For example, one or more of the LED sources 130, the first portion of LEDs 130a and/or the second portion of LEDs 130b, may be configured to activate the photoluminescent structure 110. In some embodiments, the light-producing assembly 114 may be operated such that portions of the light-producing assembly 114 are activated and other portions are not, such that the decorative layer 22 appears to be multicolored, has a pulsing effect, a specific feature (e.g., the indicia 60) is/isn't illuminated (i.e., or is a different color than the rest of the decorative layer 22) and/or has a gradient to the color or intensity of light. By activating the light-producing assembly 114, the color of the illumination from the decorative layer 22 may change from a first color to a second color. The change in color of the decorative layer 22 may serve to communicate information (e.g., speed, transmission state, occupancy, indicate a turn), provide aesthetic lighting (e.g., pulse with music, provide warm ambient lighting, pulse with a sensed heartbeat) or to provide large area ambient illumination to an exterior of the vehicle 10. Further, the controller 142 may be configured to activate the light source 34 such that diffraction gratings 30 of the over-mold 26 diffract the incident light 76 in a pleasing manner.

Use of the present disclosure may offer several advantages. First, use of silicone as the over-mold 26 allows for both a soft feeling surface for users while allowing a slick and hydrophobic surface off which contaminants typically found around vehicles may be found. Further, silicone will allow for a surface which is scratch and mar resistant and resistant to ultraviolet damage. Second, the use of the silicone over-mold 26 may allow for the dampening of acoustic energy through the applique 14. Third, use of the over-mold 26 in conjunction with the diffraction gratings 30 allows for the automotive designers to add jewel-like iridescence to vehicle components.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims as set forth below are incorporated into and constitute part of this Detailed Description.

What is claimed is:

1. A vehicle applique, comprising:
   a decorative layer positioned on a substantially transparent substrate and having a woodgrain textured appearance;
   an over-mold comprising silicone positioned over the decorative layer and defining a first surface having a woodgrain textured surface, the over-mold defining at least one diffraction grating, wherein the at least one diffraction grating is configured to separate incident light striking the at least one diffraction grating into a plurality of wavelengths corresponding to a plurality of directions; and
   a light source positioned to emit light through the substrate, the decorative layer and the over-mold.

2. The vehicle applique of claim 1, wherein the over-mold defines a second surface proximate the decorative layer, the second surface defining the at least one diffraction grating.

3. The vehicle applique of claim 2, wherein the first surface of the over-mold defines at least one diffraction grating.

4. The vehicle applique of claim 2, wherein the over-mold comprises silicone and is less than about 1 mm thick and the substrate has a thickness of less than about 4 mm thick.

5. The vehicle applique of claim 1, further comprising:
   an adhesive layer positioned between the light source and the substantially transparent substrate.

6. The vehicle applique of claim 1, wherein the substrate comprises at least one of a phosphorescent material and a photoluminescent material.

7. The vehicle applique of claim 1, wherein the at least one diffraction grating is configure to produce an iridescent appearance.

8. A vehicle, comprising:
   an exterior panel; and
   an applique positioned on the exterior panel, comprising:
   a decorative layer positioned on a surface of a substantially transparent substrate; and
   an over-mold comprising silicone positioned on the decorative layer, wherein the over-mold defines a plurality of diffraction gratings, further wherein the plurality of diffraction gratings is configured to separate incident light striking the plurality of diffraction gratings into a plurality of wavelengths corresponding to a plurality of directions; wherein the decorative layer comprises a woodgrain textured appearance, and wherein the overmold defines a woodgrain textured surface.

9. The vehicle of claim 8, wherein the exterior panel is a trunk lid.

10. The vehicle of claim 8, further comprising:
    a light source positioned on an opposite side of the substrate than the decorative layer, the light source configured to emit light through the decorative layer.

11. The vehicle of claim 8, wherein the substrate comprises at least one of a phosphorescent material and a photoluminescent material.

12. The vehicle of claim 8, wherein the plurality of diffraction gratings is configured to produce an iridescent appearance.

13. The vehicle of claim 8, wherein the decorative layer comprises a vacuumized metal layer.

14. The vehicle of claim 8, wherein the over-mold comprises a first surface and a second surface; and
    wherein the plurality of diffraction grating comprises a first plurality of diffraction gratings defined on the first surface and a second plurality of diffraction gratings defined on the second surface, and wherein a plurality of spacings is defined between the first plurality of diffraction gratings on the first surface and the second plurality of diffraction gratings are aligned with the plurality of spacings.

15. A vehicle, comprising:
    an applique positioned on an interior panel, comprising:
    an over-mold positioned on a substrate, wherein the over-mold defines at least one diffraction grating on a second surface, the at least one diffraction grating configured to separate incident light striking the at least one diffraction grating into a plurality of wavelengths corresponding to a plurality of directions, further wherein the overmold defines a textured surface on the first surface; and
    a decorative layer having a textured appearance corresponding to the textured surface, wherein a light source and the over-mold are positioned on opposite sides of the substrate; wherein the textures surface comprises a woodgrain textured surface and the textured appearance comprises a woodgrain textured appearance.

16. The vehicle of claim 15, wherein the substrate comprises at least one of a phosphorescent material and a photoluminescent material.

17. The vehicle of claim 16, wherein the over-mold comprises silicone and is less than about 1 mm thick and the substrate has a thickness of less than about 4 mm thick.

18. The vehicle of claim 15, wherein the at least one diffraction grating is configured to produce an iridescent appearance.

* * * * *